United States Patent [19]

Phillips

[11] Patent Number: 4,477,533
[45] Date of Patent: Oct. 16, 1984

[54] LAMINATES CONTAINING INORGANIC STRUCTURAL MATERIALS

[75] Inventor: Cecil L. Phillips, Boughton, England

[73] Assignee: Scott Bader Company Limited, Northamptonshire, United Kingdom

[21] Appl. No.: 432,856

[22] Filed: Oct. 5, 1982

[30] Foreign Application Priority Data

Oct. 6, 1981 [GB] United Kingdom ............... 8130121
Jan. 18, 1982 [GB] United Kingdom ............... 8201280

[51] Int. Cl.³ .................. B32B 13/06; B32B 15/08
[52] U.S. Cl. .................. 428/458; 428/425.5; 428/425.8; 428/483; 428/703
[58] Field of Search .................. 428/418, 425.8, 703, 428/425.5, 446, 458, 483, 457; 427/316

[56] References Cited

U.S. PATENT DOCUMENTS 3,911,178 10/1975 McDowell et al. ......... 428/425.8 X
4,279,962 7/1981 Meyer et al. .................. 428/418
4,292,364 9/1981 Wesch et al. ................ 428/703 X

FOREIGN PATENT DOCUMENTS 1431324 4/1976 United Kingdom .
1512084 5/1978 United Kingdom ............... 428/703

OTHER PUBLICATIONS

PCT Publication No. WO81/00985, Jasperson, Apr. 16, 1981, p. 25.

Primary Examiner—Thomas J. Herbert
Attorney, Agent, or Firm—Cushman, Darby & Cushman

[57] ABSTRACT

A laminate containing an inorganic structural material clad with a facing of metal or plastics material has at least one layer of adhesive between the structural material and the facing. The adhesive preferably includes either a layer of polyester modified hydraulic cement or a thermosetting resin and more preferably one layer of polyester modified cement adjacent the structural material and one layer of thermosetting resin adjacent the facing.

4 Claims, No Drawings

LAMINATES CONTAINING INORGANIC STRUCTURAL MATERIALS

FIELD OF THE INVENTION

This invention relates to laminates containing inorganic structural materials.

BACKGROUND OF THE INVENTION

Inorganic structural materials have many desirable properties for a wide range of applications especially in the building industry. However improvements in surface finish and appearance are often desirable and in some cases such as glass reinforced cement (GRC) a measure of protection from long term weathering is required.

Water penetration into structural inorganic materials could be reduced by using a plastics or metal facing. However bonding between the facing material and the inorganic layer is a problem, especially from the cost point of view, if the inorganic structural materials are to be wet laid up directly on the facing.

GB 1065053 discloses a polyester modified cement useful for making concrete and said to be useful for covering metals, hardwood and other wet or dry surfaces and to adhere strongly to such surfaces. However the cement does not appear to have been previously used as an adhesive for bonding a facing to structural materials.

GB 2092950A describes a method of providing a glass reinforced plastics (GRP) laminate with a metal facing, which method includes coating the metal facing with an adhesive, laying the facing in a mould, and, after allowing the adhesive to cure, laying uncured thermosetting resin and reinforcement on the adhesive (see also copending U.S. Pat. application No. 340,405). However, at that time the cladding of an inorganic material with a protective facing still presented a problem to the building industry.

SUMMARY OF THE INVENTION

A laminate in accordance with the invention contains an inorganic structural material clad with a facing of metal or plastics material secured efficiently thereto by at least one layer of adhesive containing a polymeric material between the inorganic structural material and the facing.

At least one such layer of adhesive is preferably a polyester modified hydraulic cement. This consists of resin including an unsaturated polyester and a monomer copolymerizable therewith and a hydraulic cement, i.e. an inorganic substance which on mixing with water at ambient temperature reacts to produce a crystalline lattice structure exhibiting a degree of mechanical stability and/or physical strength (see GB No. 1065053). When the resin and monomer, hydraulic cement powder and water are mixed together with a water-soluble peroxide catalyst a hydraulic cement is formed which we find, is compatible with both organic and inorganic systems and sets to a rigid mass giving a particularly high strength adhesive for bonding the inorganic structural material to the facing. This action is due to the combined hydraulic action of the water on the cement and the formation of free radicals from the peroxide which cause cross-linking of the polyester.

When forming a laminate using this adhesive it is preferable to lay the cement mix on one of the layers which is to form the laminate, allow it to cure to the gel state, and thereafter lay the next adjacent layer of the laminate on the cured cement mix.

An alternative adhesive of a laminate in accordance with the invention is a thermosetting resin, a synthetic or natural rubber or a thermoplastics material and the following types are found suitable:

(i) natural rubber,
(ii) synthetic rubbers such as nitrile, neoprene and styrene/butadiene,
(iii) thermoplastics such as cyanoacrylates, hot melts (ethylene/vinyl acetate, polyamide), polyvinyl acetate, polyvinyl butyral, acrylates and copolymers,
(iv) thermoset resins such as epoxides, polyesters, vinyl esters, urethane acrylates, urethanes, anaerobic acrylics or condensation polymers, e.g. phenol formaldehydes or urea formaldehydes.

Some of the adhesives only cure properly in the absence of air, e.g. the anaerobic acrylics and in these instances a sheet of PTFE is laid over the priming coat and left in place until the adhesive layer is cured and the PTFE sheet then removed.

Examples of such adhesives include:
Derakane 411-45—Vinyl ester.
Tenexatex 4611—Nitrile phenolic.
Indatex SE765—Acrylic emulsion.
Permabond C—Cyanocrylate.
Tenexatex 3964—Polyvinyl acetate emulsion.
Nutrim 5003—Nitrile phenolic ironed on film—cured for 30 minutes at 150° C.
Indasol NS240—Natural rubber latex.
Indasol CS1659—Neoprene latex.
Crodafix 27-8-700—ethylene/vinyl acetate emulsion.
Igetabond 7B—Hot melt.
Crodagrip 14-00300—2 pot polyurethane.
Polyfunctional acrylate terminated polymer containing urethane linkages (+80 pphr talc).
Permabond E04—2 pot epoxy.
Permabond F241—2 pot acrylic covered by PTFE sheet until cured.

Preferred adhesives are cold curable, or hot curable thermosetting resins for example, an epoxide, polyester, vinyl ester, urethane, urethane acrylate or acrylic resin. A preferred thermosetting resin is an acrylate (i.e. unsubstituted or substituted acrylate) terminated urethane resin, these being curable either hot or cold. A particularly preferred such resin is the acrylated terminated urethane resin described in GB 2092950A and copending U.S. Pat. application No. 340,405 filed Jan. 18, 1982 this being particularly suitable for bonding a metal facing to an inorganic structural material. This adhesive is prepared as follows:

1.0 M Sorbitol and 18.0 M ε—Caprolactone were charged to a suitable reaction vessel and heated to 90°-100° C. with stirring. A cloudy homogeneous dispersion was obtained to which was added 0.2% p-toluene sulphonic acid. An exothermic reaction began almost instantaneously and the temperature rose peaking at 140°-150° C.

The batch was allowed to cool naturally for 15 minutes and was then vacuum stripped. Less than 2% of charge weight was removed.

After stripping, the temperature was adjusted to 100°-110° C. and 3.5 M isophorone di-isocyanate was added. A gentle exotherm began and the batch temperature was allowed to rise to 120°-130° C. were it was controlled by cooling.

When the exotherm was over, the batch was cooled to 90°-95° C. and 3.5 M 2-hydroxy ethyl acrylate and 100 ppm hydroquinone were added. A below the surface feed of air was started and the temperature was adjusted to 80°-85° C. The batch was maintained at this temperature until the isocyanate content was less than 0.6% (equivalent to 95% conversion). The batch was then dissolved in styrene to provide a composition containing approximately 60% solids by weight.

When forming a laminate using a thermosetting resin, it is preferable to lay the uncured resin on one of the layers, allow the uncured resin to cure, preferably completely, and thereafter lay up the next adjacent layer of the laminate on the cured thermosetting resin:

A particularly preferred bonding system of a laminate in accordance with the present invention includes two layers of adhesive adjacent one another, one layer being a polyester modified hydraulic cement adjacent the inorganic structural material and the other layer being a thermosetting resin adjacent the facing. Preferably, when laying the polyester modified hydraulic cement on the thermosetting resin layer, the resin layer is allowed to cure, preferably completely, before laying up uncured polyester modified hydraulic cement thereon. When laying the thermosetting resin on the polyester modified hydraulic cement, the cement is preferably cured, at least to the gel state, before laying up uncured thermosetting resin thereon.

Typical inorganic structural materials of a laminate in accordance with the invention are cement, for example, fibre reinforced cement (FRC), low void content cement (see EP 55035), fibre reinforced gypsum (FRG) and concrete, e.g. conventional concrete and resin concrete. The fibre reinforcement of the cement or gypsum is preferably glass (GRC and GRG respectively) but may, for example, be polyaramid, polyamide, carbon or hybrids thereof.

The facing may, for example, be a metal, e.g. stainless steel, aluminium, chromium, titanium, tin, copper, lead, zinc, phosphor bronze, nickel, molybdenum, galvanized steel, brass or mild steel. The thickness of the metal may be from 0.1 mm upwards but normally the thinnest material would be used for economic reasons. Preferred metals are stainless steel and aluminium. Indeed stainless steel sheets are now available at thicknesses down to about 0.08 mm and these are especially preferred.

Good bonds, as measured by lap shear and peel strengths, can be obtained when the metals are solvent degreased before application of the adhesive material but improved adhesion can be obtained by abrasion followed by a solvent wipe or alkaline or acid etching.

As an alternative to a metal facing, a laminate in accordance with the invention may have a facing of plastics material, for example, a polyester gel coat, which may be strengthened by one or more layers of thermosetting resin, preferably reinforced. The resin is bound to the inorganic structural material by the adhesive layer or layers and carries the gel coating.

The facing can, if desired, be formed into shape before lamination, for example, by pressing.

The laminate may, for example, be a sandwich structure, having a core of the inorganic structural material between two faces either of which may be metal or plastics attached to a respective surface of the structural material by a respective bonding system.

In an alternative embodiment, a metal facing is secured to a GRP laminate by a thermosetting resin adhesive, preferably urethane acrylate, and the GRP laminate is secured to the inorganic structural material by a polyester modified hydraulic cement.

Laminates in accordance with the invention are particularly useful as building structures, for example, as building panels.

DESCRIPTION OF PREFERRED EMBODIMENTS

Laminates embodying the invention will now be described in more detail with reference to the following Examples.

EXAMPLE I

A mould was coated with a release agent and then with a gelcoat layer of CRYSTIC® GC65PA (an isophthalic acid based polyester) suitably catalysed at a thickness of 0.5 mm. After allowing the gelcoat to partially cure, a glass fibre laminate was laid on the gelcoat, the laminate consisting of 6 layers of glass chopped strand mat 450 g/m$^2$ and CRYSTIC® 272 suitably catalysed and accelerated at a resin/glass ratio of 2.3/1. This was allowed to cure until the exotherm subsided and was then coated with 700 g/m$^2$ ESTERCRETE® (a polyester hydraulic cement) which was allowed to cure to gelstate. Glass fiber reinforced cement (GRC) containing 5% chopped glass fibres (25 mm long) by weight in SNOWCRETE® (a commercially available cement) at a water:cement ratio of 0.4:1 was laid up on the ESTERCRETE surface to a thickness of 6 mm.

the resultant composite panel which could be used as a building panel had a good weatherproof gelcoated finish with good adhesion between the various layers. The material was inexpensive and the GRC provided a low smoke first retardant layer on the inside.

EXAMPLE II

The procedure followed in Example I was reversed. A GRC layer was laid down and allowed to set to a green state. 700 g/m$^2$ ESTERCRETE was placed on top and allowed to cure to a gel state and a glass fibre reinforced CRYSTIC® 272 laminate laid up on top with a CRYSTIC GC65PA flowcoat finish.

EXAMPLE III

A thin aluminium sheet (0.5 mm thick) was solvent degreased and coated with a polyfunctional acrylate terminated polymer containing urethane linkages (300 g/m$^2$) which was allowed to cure at least partially. A layer of glass fibre reinforced polyester was then laid down on the primed surface. This consisted of 1 layer of 450 g/m$^2$ glass chopped strand mat and CRYSTIC® 272 resin suitably catalysed and accelerated. After at least partial curing of the resin, a layer of ESTERCRETE® and a layer of GRC were laid as described in Example I.

An excellent composite was obtained with an aluminium face.

EXAMPLE IV

The same procedure as in Example III was followed but without the GRP layer. A layer of ESTERCRETE containing one layer of 450 g/m$^2$ chopped strand mat was laid down on the primed surface and allowed to cure to the gel state before a 6 mm thick layer of glass reinforced cement was laid up.

The interfaced bonds were very difficult to break.

EXAMPLE V

The same procedure as in Example IV was followed except that the GRC was laid up in a mould with the layer of polyester hydraulic cement and the primed metal sheet pressed down on top of it.

EXAMPLE VI

The surface of a stainless steel sheet (0.45 mm thick) was prepared and treated as in Example III and a layer of ESTERCRETE® applied as in Example IV. A 12 mm thick layer of concrete was then spread on the ESTERCRETE® layer.

EXAMPLE VII

The surface of an aluminium sheet (0.5 mm thick) was prepared and primed as in Example III. After the primer had cured a 12 mm thick layer of a resin concrete (a dry mix of 10% polyester resin 90% aggregate) was spread on the treated sheet and allowed to cure. A good interfacial bond was achieved, the interface being extremely difficult to break.

EXAMPLE VIII

Two thin stainless steel sheets were solvent degreased and coated with a polyfunctional acrylate terminated polymer containing urethane linkages (300 g/m$^2$). A layer of reinforced ESTERCRETE was applied to each sheet as described in Example IV. A 10 mm thick layer of glass reinforced cement was sandwiched between the two stainless steel plates.

EXAMPLES IX AND X

The same procedure as described in Example VIII was followed except that in one case a 12 mm layer of concrete was used as the core material and in the other a 12 mm thick layer of resin concrete was used.

EXAMPLE XI

The same procedure as that described in Example VIII was followed except that 4 layers of a cementitious material as described in European Patent Publication No. 0055035 was hot press moulded, as the core material, between the urethane/Estercrete primed metallic faces.

EXAMPLE XII

The same procedure as that described in Example VI was followed except that 4 layers of a cementitious material as described in European Patent Publication No. 0055035 was hot press moulded onto the Estercrete layer to form an inexpensive metal faced material with excellent internal bond strength.

EXAMPLE XIII

A thin sheet of aluminium was solvent degreased and coated with a polyfunctional acrylate terminated polymer containing urethane linkages. This was allowed to cure and a glass fibre laminate laid up on the primed surface using Crystic 272 (an isophthalic based polyester resin), suitably catalysed and accelerated, with 6 layers of glass fibre chopped strand mat 450 g/m$^2$ at a resin:glass ratio of 2.3:1. This was allowed to cure until the exotherm subsided and then coated with 700 g/m$^2$ of a polyester modified hydraulic cement, such as Estercrete, which was allowed to cure to a gel-state. Glass fibre reinforced cement (containing 5% chopped glass fibre (25 mm long) by weight in Snowcrete) at a water:cement ratio of 6.4:1 was laid up on the Estercrete primed surface to a thickness of 6 mm. The interfaces in the structure were extremely difficult to break.

The material was both stiff and inexpensive with a good surface finish—aluminium.

As an alternative facing to aluminium, excellent results are also achieved using thin sheets of aluminium, copper, brass, zinc, phosphor bronze, nickel, tin, titanium, molybdenum, lead, chromium, mild steel, and galvanised steel.

Similar trends in shear strengths are obtained in each case.

EXAMPLE XIV

The same procedure as in Example XIII was followed but immediately behind the primed metal sheet a glass reinforced polyester modified hydraulic cement, such as Estercrete, layer containing 1 layer of 450 g/m$^2$ of chopped strand mat was laid up and allowed to cure to a gel-state before 6 mm of glass fibre reinforced cement was laid up.

The interfaces in the structure were extremely difficult to break.

EXAMPLE XV

The same procedure as in Example XIV was followed but the glass reinforced cement was laid up on a mould and the primed metal sheet with glass reinforced polyester modified hydraulic cement, such as Estercrete, layer, in the gelled state, was taken and pressed down on top of the wet cement. After cure the interfaces in the structure were found to be extremely difficult to break.

EXAMPLE XVI

The surface of an aluminium sheet was prepared as in Example XIV and a 12 mm thick concrete layer was used in place of glass reinforced cement behind the Estercrete layer.

EXAMPLE XVII

The surface of a stainless steel sheet was solvent degreased and coated with a polyfunctional acrylate terminated polymer containing urethane linkages. This was allowed to cure and a resin concrete (10% resin by weight) layer 12 mm thick was laid up behind the metal and allowed to cure.

After cure the interface was extremely difficult to break.

EXAMPLE XVIII

This illustrates the manufacture of metal clad sheets for internal (easy clean) use or external decorative applications.

Thin aluminium sheet 0.45 mm thick was abraded and degreased, coated with a polyfunctional acrylate terminated polymer containing urethane linkages which contained 80 pph resin of talc primer which was allowed to cure. Crystic 272 polyester resin containing 33% by weight silica hollow microspheres (sold under the name Fillite®) suitably catalysed and accelerated were poured on to the sheet to a depth of 10 mm. When this layer was cured one layer of 450 g/m$^2$ chopped strand mat glass fibre was laid down and impregnated with catalysed and accelerated Crystic 272 resin. After at least partially curing the resin, a glass reinforced polyester modified hydraulic cement (Estercrete) containing 1 layer of 450 g/m$^2$ of chopped strand mat was laid up and allowed to cure to a gel state. A 6 mm layer of glass fibre reinforced cement was then laid up on the Estercrete layer.

The sheet could be used as a decorative building panel with the aluminium surface providing good weatherability. Sheet of this type could be used for manufacturing containers and could be automatically processed using, for example, resin injection, press moulding, pultrusion.

I claim:

1. A rigid structural composite having a plurality of layers comprising:
   a facing layer of a material selected from a metal and a thermosetting resin;
   an adhesive layer having two faces, one said face bonded to one face of the facing layer, the said adhesive layer consisting essentially of a polyester-modified hyraulic cement; and
   a structural rigid cementitious layer bonded to the second of the two said faces of the adhesive layer and consisting essentially of inorganic cement;
   whereby the cementitious layer and facing layer are strongly bonded together by the adhesive layer.

2. A rigid structural composite having a plurality of layers comprising:
   a facing layer of a material selected from a metal and a thermosetting resin;
   a first adhesive layer having two faces, one said face bonded to one face of the facing layer, the said first adhesive layer consisting essentially of an organic thermosetting resin;
   a second adhesive layer having two faces, one said face bonded to the second of the two said faces of the first adhesive layer, the second adhesive layer consisting essentially of a polyester-modified hydraulic cement; and
   a structural rigid cementitious layer bonded to the second of the two said faces of the second adhesive layer and consisting essentially of inorganic cement;
   whereby the cementitious layer and facing layer are strongly bonded together by the adhesive layers.

3. A rigid structural composite according to claim 2, wherein the organic thermosetting resin is an acrylate-terminated urethane resin.

4. A rigid structural composite having a plurality of layers comprising:
   a first layer of a material selected from a metal and a thermosetting resin;
   a second layer having two faces the second layer being an adhesive layer comprising an acrylate-terminated urethane resin bonded by one of two said faces to the first layer; and
   a third layer having a face bonded to the second of the two said faces of the second layer, the third layer being a rigid structural layer of the composite and comprising a polyester-modified hydraulic cement.

* * * * *